UNITED STATES PATENT OFFICE.

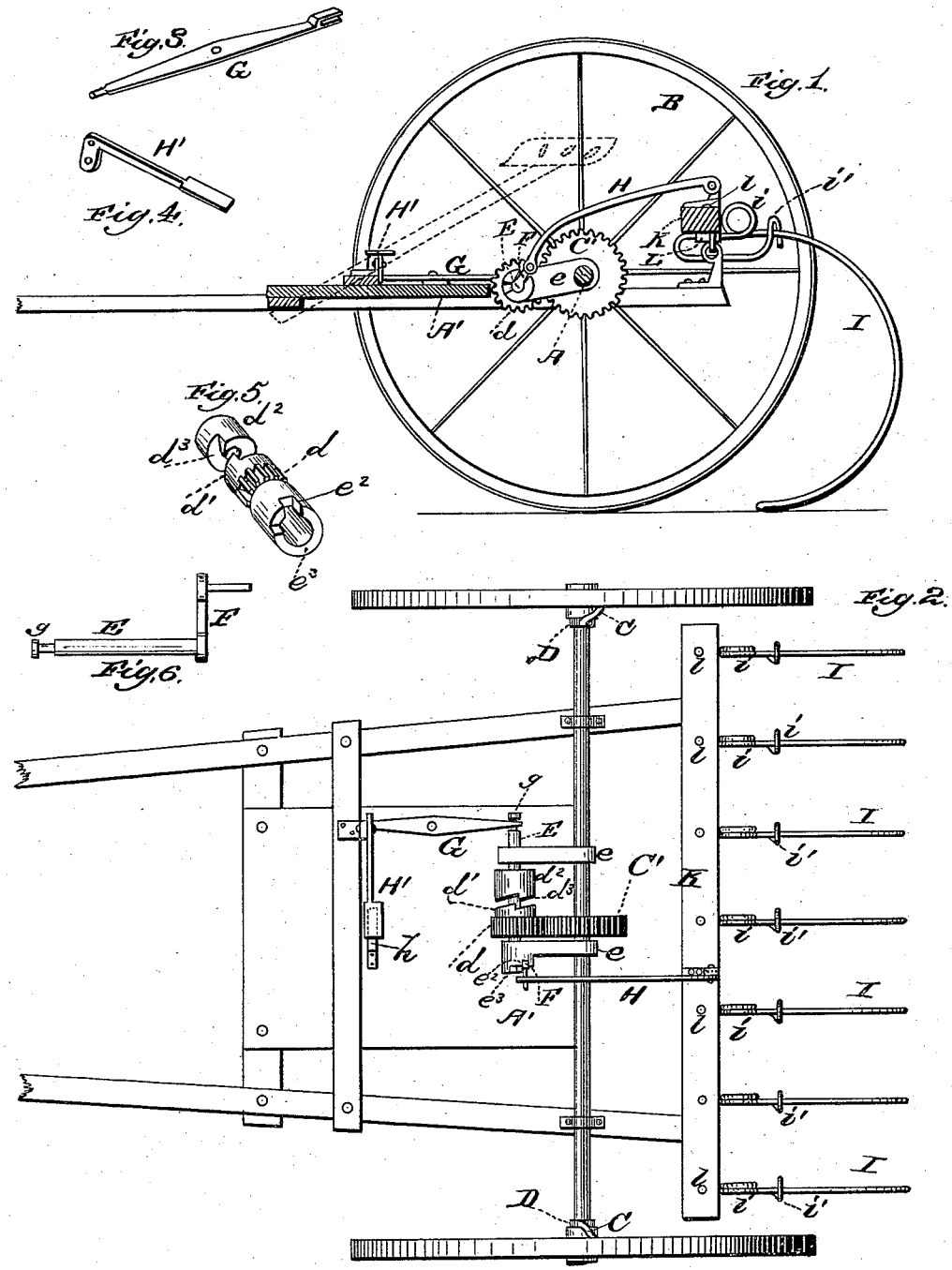

MICHAEL DALEY, OF WATERMAN, ILLINOIS.

HORSE HAY-RAKE.

SPECIFICATION forming part of Letters Patent No. 290,864, dated December 25, 1883.

Application filed July 29, 1882. (No model.)

*To all whom it may concern:*

Be it known that I, MICHAEL DALEY, a citizen of the United States, residing at Waterman, in the county of De Kalb and State of Illinois, have invented a new and valuable Improvement in Horse Hay-Rakes; and I do hereby declare that the following is a full, clear, and exact description of the construction and operation of the same, reference being had to the annexed drawings, making a part of this specification, and to the letters and figures of reference marked thereon.

Figure 1 of the drawings is a vertical sectional view of my rake. Fig. 2 is a top or plan view of the same. Figs. 3, 4, 5, and 6 are detail views.

The object of this invention is to provide certain devices for dumping the rake after a sufficient quantity of hay has been gathered up by the rake-teeth; also, to improve the construction of the teeth so as to render them capable of withstanding such resistance as they may be subjected to.

A indicates the axle, upon which are mounted the supporting-wheels B B. These wheels can turn backward freely upon said axle; but in turning forward they are held rigid with the axle by means of a pawl and ratchet, C D, at the inner ends of their hubs, whereby during the forward movement of the machine the axle will be caused to have an axial rotation. A gear, C', fixed upon the middle of the axle, engages a pinion, $d$, arranged loosely upon a short shaft, E, located in front of the axle, and supported in bearing-blocks $e$, which are secured to the frame A' of the machine. This pinion is provided at one side with clutch-teeth $d'$, and forms a part of the clutch mechanism, the remaining part $d^2$ of the clutch consisting of a hub provided at its side with clutch-teeth $d^3$, and rigidly secured upon the short shaft E. The above shaft is capable of an endwise movement in its bearings, so that by shifting it in one direction its toothed hub can be clutched with the clutch-teeth of the pinion, and the rotation of the short shaft thereby effected. Said short shaft is provided at one end with a crank, F, and at its opposite end it is connected with a lever, G, employed for giving an endwise thrust to the shaft, so as to engage it with or disengage it from the pinion at the will of the operator. The crank connects with the swinging rake-head by a pitman, H, and hence when the short shaft is turned in its bearings the rake will be raised from the ground so as to dump the collected hay. As soon as the crank passes the vertical central line the weight of the rake will turn the shaft more rapidly than it will be turned by the pinion, and hence the short shaft will be unclutched from the pinion and automatically moved in the direction of its axis.

The mechanism for effecting the endwise movement or thrust of the short shaft consists of the said lever G, pivoted at its middle, and at one end attached to the short shaft by a set screw or bolt, $g$. The forward end of said lever passes through the lower end of the pivoted treadle H', which is arranged within convenient reach of the driver's foot, and normally held so as to maintain the clutch mechanism disconnected by means of a spring, $h$. This step is pivoted at its center to the main frame, one end being under the driver's foot, and the other end being connected with the lever G. By depressing one end of the step the lever will be moved one way, and by depressing its opposite end the lever will be moved in the opposite direction. The bearing-box $e$ for shaft E is provided at one end with a notch, $e^2$, and also with an inclined face, $e^3$, on said end. When the shaft E receives its endwise thrust, the crank F will be forced out of said notch, and as the shaft is rotated it will ride over the incline $e^3$, which will serve to maintain the clutch-hub $d^2$ in clutch with the pinion until the crank has passed the incline and reached a point opposite the notch, at which juncture the crank will be drawn into the notch by means of the spring already described, it being understood that the operator will release the treadle or relieve it from pressure, so as to enable the spring to actuate the lever, and thereby cause the back-thrust of the shaft. This locks the rake down and prevents it from being raised until the lever is again actuated, and the shaft moved axially so as to throw the crank out of the notch and bring the clutch-hub into clutch with the pinion, in order to give the requisite rotation to the shaft, so as to turn the crank and raise the rake.

I indicates the curved spring rake-teeth, each of which is held against the under side of the rake-head K by means of a casting, L, secured to said head by a bolt, l. The rake-teeth are each formed with a circular bend, i, in rear of the rake-head, so as to give additional spring to the tooth, and its forward end is returned and the termination thereof bent into the form of a hook, i', which is caught upon the tooth back of the head.

In raking heavy hay, when the rake-teeth are bent back, they will be held by said hook-shaped terminations, whereby the strength of the teeth will be greatly increased. The upper ends of rake-teeth have been bent back upon themselves and passed through slots in a holding-board, or bent downward and under and rested against the under edge of said board. Stiffening-springs placed around the teeth where they enter the rake-head have been bent over toward the seat, then underneath around the rake-head back to the teeth, and their ends connected to the teeth, one above the other, thereby forming two distinct supports for the teeth; and curved spring-braces made separately and fastened to the top of the rake-head have been grooved at their lower end and brought down upon the teeth to brace them. Mechanism for lifting the rake to discharge the hay by the forward motion of the machine is also known, and none of these constructions are broadly claimed.

Having thus described my invention, what I claim is—

1. The combination, with the rake-head, of the curved spring-teeth I, held against the under side of the rake-head by the castings L, secured thereto by bolts l, said teeth being provided with a circular bend, i, in rear of the rake-head, and having their forward ends returned under the castings, and provided with hooks i', which catch over the teeth in rear of the circular bends i, substantially as specified.

2. The combination, with the rake, of the rotary and slidable shaft, the clutch mechanism for connecting said shaft with a rotary driving-shaft, and the box e, provided at one end with a notch for receiving the crank, and thereby locking the rake, substantially as described.

3. The combination, with the shaft E, of the clutch mechanism, the box e, provided at one end with a notch and with an incline, $e^3$, and the crank F, connecting said shaft with the rake-head, and adapted to enter the notch so as to lock down the rake, or to ride over the incline so as to maintain the clutch-hub in clutch with the clutch-pinion of said clutch mechanism, substantially as described.

In testimony that I claim the above I have hereunto subscribed my name in the presence of two witnesses.

MICHAEL DALEY.

Witnesses:
W. C. THOMAS,
GEORGE LEARD.